Sept. 19, 1961

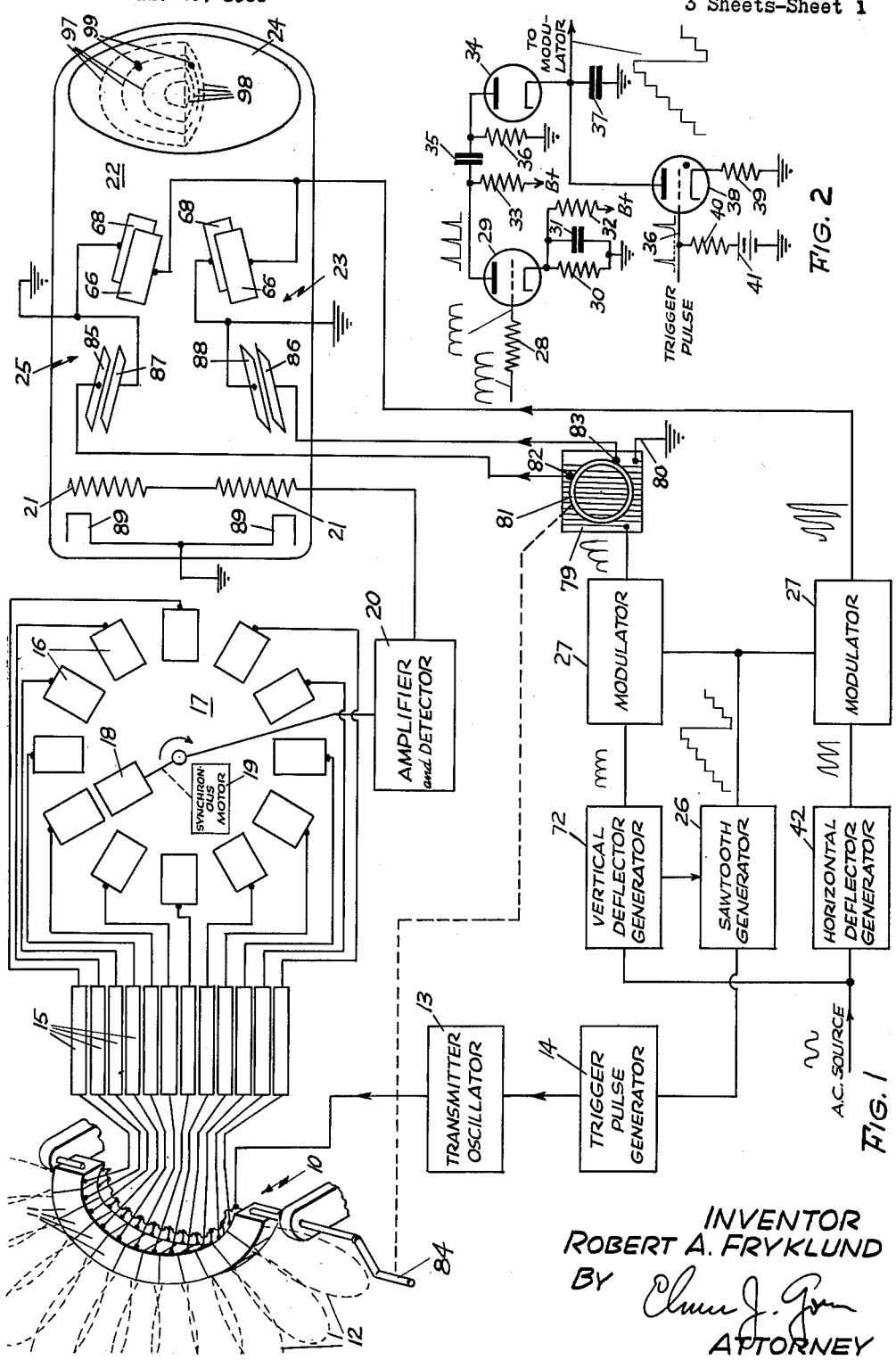

R. A. FRYKLUND 3,001,190

ECHO RANGING DEVICES

Filed Jan. 29, 1953

INVENTOR
ROBERT A. FRYKLUND
BY
ATTORNEY

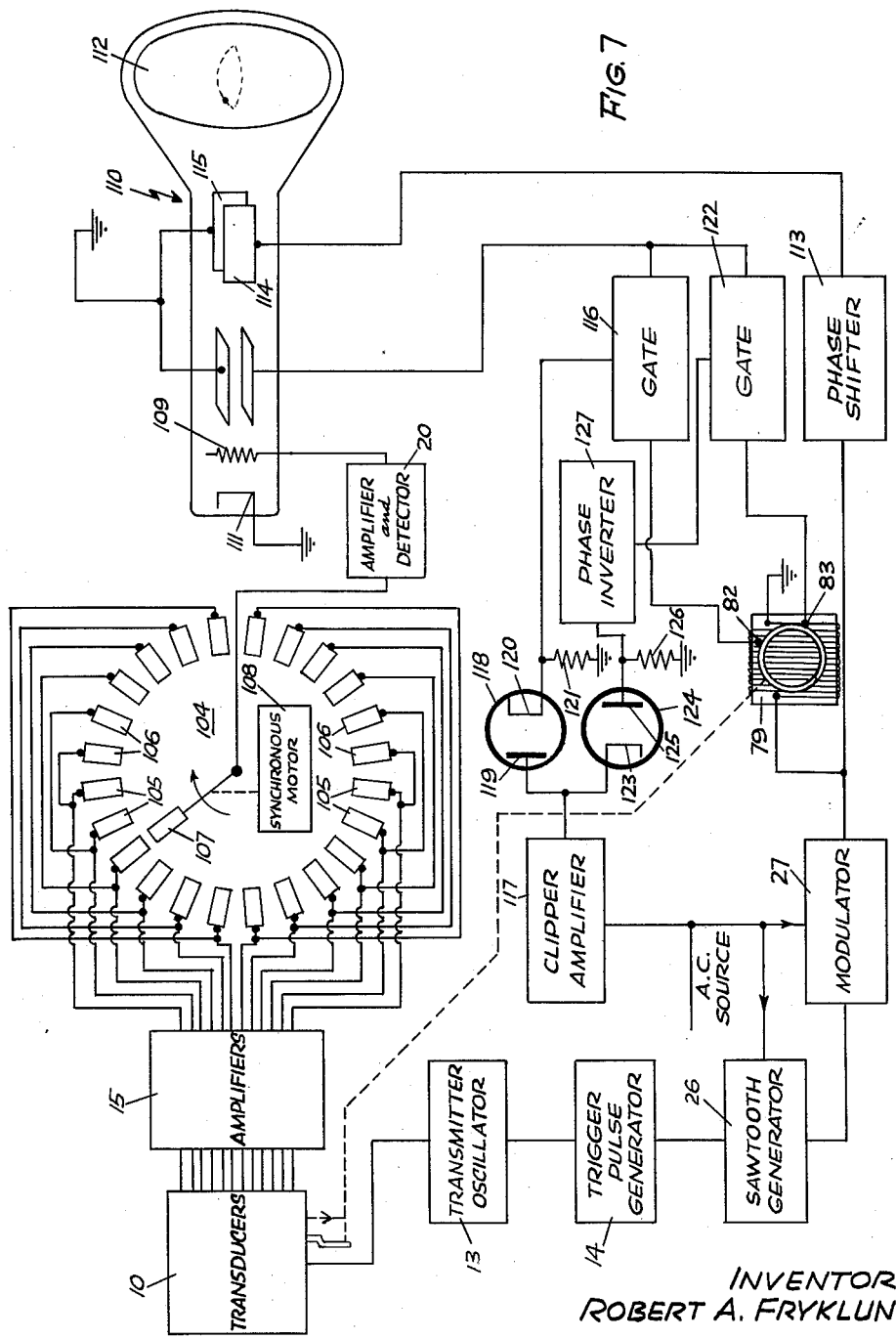

United States Patent Office 3,001,190
Patented Sept. 19, 1961

3,001,190
ECHO RANGING DEVICES
Robert A. Fryklund, Dedham, Mass., assignor to Raytheon Company, a corporation of Delaware
Filed Jan. 29, 1953, Ser. No. 333,941
13 Claims. (Cl. 343—10)

This invention relates to echo ranging devices and more particularly to underwater sound devices useful for locating submerged objects, such as the bottom of the water body, vessels and obstructions, or fish.

Systems are well known wherein a single sound head is caused to be trained around with the indicator producing an indication containing direction as well as distance information. Also, systems are known wherein a plurality of directional transducers are fixed such that their beams overlap slightly and the output of the transducers is successively scanned to produce a plan position indication on a cathode ray tube.

This invention discloses that a plurality of directional transducers may be oriented such that their beams slightly overlap and consecutively cover a relatively wide range of azimuth, and that the transducer assembly may be rotated about a horizontal axis such that the directional overlap transducer patterns may be directed downward. This invention further discloses an indicator which will produce indications of the downward training of the transducers such that both the depth and the horizontal distance, as well as the direction, of the object may be indicated on the indicator. Briefly, this may be accomplished in one embodiment of the invention by the use of a cathode ray tube having two guns with the vertical deflection systems of the two guns fed by sweep signals which pass through a sine-cosine resolver connected to transducer assembly such that rotation of the transducer assembly downward will cause rotation of the sine-cosine resolver to vary the respective amplitude of the sweep signals fed to the vertical deflection systems of the two guns. The output of a scanning system which successively scans the outputs of each of the transducers is fed simultaneously to the grids of both guns such that the indications appearing on the screen from each gun are a function of the depth and horizontal distance, respectively, of the underwater target.

This invention also discloses a particular sweep generating system which produces a stepped sawtooth wave form initiated by the trigger pulse which triggers the transmitter oscillator to emit the signal vibrations into the water. The stepped sawtooth increases in a discrete predetermined amount at the beginning of a scanned cycle of the outputs of the transducers such that as the cathode ray tube beams are scanned across the face of the tube, the amplitude of the sweep voltage increases by a predetermined amount at the beginning of the sweep cycle.

This invention further discloses a modification of the invention wherein the indicator may be a single gun cathode ray tube with the pattern for the plan position portion of the indication being produced during one scanning cycle and the depth pattern is produced during the next scanning cycle by the use of time-sharing techniques.

Other and further objects and advantages of this invention will be apparent as the description thereof progresses, reference being had to the accompanying drawings, wherein:

FIG. 1 illustrates a partial block diagram and partial schematic diagram of a system embodying this invention;

FIG. 2 illustrates a schematic diagram of a stepped sawtooth generator which may be used in the device of FIG. 1;

FIG. 7 illustrates a partial block diagram and a partial schematic diagram illustrating an additional embodiment of the invention.

Figure 3:
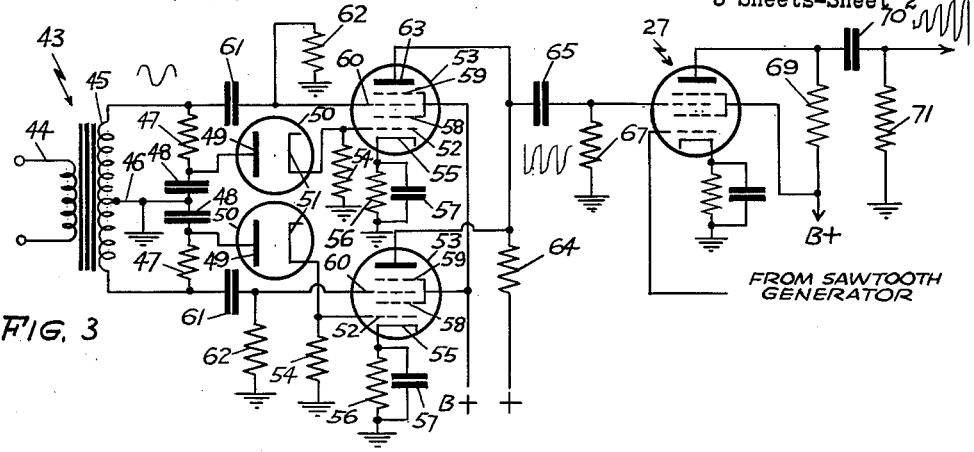
FIG. 3 illustrates a schematic diagram of a horizontal deflection generator which may be used in the system illustrated in FIG. 1.

Referring now to FIG. 1, there is shown a transducer assembly 10 comprising a plurality of directional transducers 11 arranged in a half circle. The transducers 11 are of the directional type and produce radiation patterns 12, which overlap somewhat such that a fan-shaped beam pattern is produced. The particular details of directional transducers which may be used for this purpose are well known and do not form a part of this invention. The inputs to the transducers 11 on which the transmitted signal is impressed comprise one terminal of each transducer, these inputs being all connected in parallel through a common bus to a transmitter oscillator 13. Transmitter oscillator 13 is periodically keyed in response to the output of a trigger pulse generator 14 to produce short bursts of oscillations at the operating frequency of the transducers, which may be, for example, on the order of fifteen to fifty kilocycles. The outputs of the transducers 11 are each connected to separate amplifiers 15 which, if desired, may include a detector stage. The outputs of each of the amplifiers 15 are fed to a separate stator plate 16 of a capacitor type commutator 17. The stator plates 16 may be, for example, arranged in a circle and a single rotor plate 18 may be caused to rotate successively past each of the stator plates by means of synchronous motor 19 thereby causing a signal appearing on each of the stator plates 16 to be successively transferred to the rotor plate 18. If the signals passed by the amplifier 15 are not detected, the signals will be passed from the stator plates 16 to the rotor plate 18 by capacitive coupling. If, however, the amplifiers 15 contain a detector stage, the signal applied to the stator plates 16 will be a substantially D.C. signal and will be transferred to the rotor plate 18 by induction. The signal output of the rotor plate 18 is fed through an amplifier detector 20 to the control grids 21 of a two-gun cathode ray tube 22. A first gun 23 of the cathode ray tube produces a beam which is deflected in a pattern occupying the lower half of the screen 24 of the cathode ray tube 22, while the second gun 25 produces a pattern occupying the upper half of the screen 24.

The sweep circuits for the guns 23 and 25 may be obtained, for example, in the following manner. The trigger pulse generated by the trigger pulse 14 is also fed to a sawtooth generator 26 to initiate the generation of a sawtooth wave form which preferably is of the stepped type. However, it is to be clearly understood that a conventional linear sawtooth generator may be used, if desired. The output of the sawtooth 26 is fed to a pair of modulators 27, which will be described in detail presently and which modulate the sweep voltages applied to the deflection plates of the guns 23 and 25 in accordance with the sawtooth generator's wave form.

In order to synchronize the position of the steps in the sawtooth wave form with respect to the position of the rotor 18 of the capacitor commutator, a circuit of the type shown in FIG. 2 may be used. In this circuit an output of a vertical deflection generator 72, shown in FIG. 1, which is the full wave rectification of a sine wave fed from the same source used to energize the motor 19 and properly phase shifted, is fed through grid-limiting resistor 28 to the grid of a triode amplifier 29 whose cathode is connected to ground through a cathode bias resistor 30 bypassed by a condenser 31 and to B+ through a bleeder bias resistor 32.

The plate of triode 29 is connected to B+ through a load resistor 33 and to the plate of a diode 34 through a coupling condenser 35. The plate of diode 34 is returned to ground through a resistor 36 and the cathode of diode 34 is connected to ground through a condenser 37 across which the stepped sawtooth output wave form occurs. The cathode of diode 34 is also connected to the anode of a grid-controlled gas triode 38 whose cathode is returned to ground through a current-limiting resistor 39 and whose grid is returned to ground through a grid load resistor 40 and bias battery 41 which normally maintains the gas tube 38 cutoff. The grid of the gas tube 38 is coupled to the output of the trigger pulse generator 14 such that the tube 38 is fired each time a pulse is emitted from the generator 14 thereby discharging the condenser 37 to substantially zero potential at this time.

The full wave rectified wave form applied to the sawtooth generator from the vertical deflection generator has the peaks thereof limited at the grid of the triode 29 and the output of triode 29 at the plate appears as a series of positive pips of short duration which correspond to the excusions to zero potential of the rectified full wave sinusoidal wave form applied to the input of the sawtooth generator.

The condenser 35 is made many times smaller than the condenser 37, and as a result, each time a positive pip is impressed on the condenser 35, diode 34 conducts and condenser 37 is charged by a small substantially fixed amount. During the interim between the positive pulses, the condenser 35 returns to its normal charge position by current flow through resistor 36 and plate load resistor 33. Thus it may be seen that the output wave form of the sawtooth generator appearing across the condenser 37 is a stepped sawtooth wave form with the steps occurring at predetermined phase positions with respect to the rotor 18 of the capacitor commutator. All the elements of the circuit illustrated in FIG. 2 may be considered to be included in the box 26 of FIG. 1 labeled "sawtooth generator."

The same alternating current source energizing motor 19 is fed by any desired coupling means, such as, for example, a transformer, to a horizontal deflection generator 42. The horizontal deflection generator may be of the type shown, for example, in FIG. 3 wherein the signal is fed from alternating current source to the horizontal deflection generator through a transformer 43 having a primary winding 44 connected to the alternating current source. A secondary winding 45 of the transformer has a center tap 46 connected to ground.

Each end of the secondary winding 45 is connected to a separate identical circuit as follows. The winding 45 is connected to ground through a resistor 47 and condenser 48 in series. The junction between the resistor 47 and condenser 48 is connected to the anode 49 of a diode 50 whose cathode 51 is connected to the number one, or injection grid 52, of pentagrid tube 53, such as 6SA7. The grid 52 is connected to ground through a grid load resistor 54. The cathode 55 of tube 53 is connected to ground through a cathode bias resistor 56 bypassed by a condenser 57 according to well-known practice. The number two grid 58 and number four grid 59, which function as scanning grids, are connected together and to B+. The number three, or signal grid 60, is connected through a coupling condenser 61 to the end of the transformer winding 45 and to ground through a resistor 62.

The values of the resistor 47 and condenser 48 are adjusted such that the voltage appearing at the anode 49 of diode 50 lags the voltage output of the transformer winding 45 by substantially forty-five degrees, and the diode 50 only allows the positive half of this wave form to be applied to the grid 52.

The condenser 61 and resistor 62 are adjusted such that the wave form applied to the signal grid 60 leads the voltage of the winding 45 by substantially forty-five degrees such that the total phase differential between the voltage appearing on the grid 52 and the grid 60 is substantially ninety degrees. The amplitude of the voltage appearing on the grid 52 is sufficient to cause the tube 53 to conduct heavily and for all practical purposes may be considered as a rectangular positive gating pulse which lags the sinusoidal wave form applied to the grid 60 by ninety degrees. Thus when the positive wave form is applied to the grid 52, the portion of a sinusoidal wave form which lags the zero reference by ninety degrees appears at the plate 63 of the tube 53 and continues for a half cycle such that the wave form produces an excursion from the peak negative to the peak positive of a sinusoidal wave form following which the tube 53 is cut off for a half cycle until the next positive cycle of the grid 52.

The plate 63 of each of the circuits of each of the tubes in the separate circuits fed by the ends of the transformer winding 45 are connected through a common load resistor 64 to B+, and, hence, since the wave forms appearing in the two circuits are one hundred eighty degrees out of phase, the tubes 63 will be alternately gated on by their grids 52 such that the output wave form appearing across the load resistor 64 comprises that portion of a sine wave going from the negative peak to the positive peak and then sharply returning to the negative peak and continuing through a sinusoidal wave form path to the positive peak.

The output of the horizontal deflection generator appearing across resistor 64 is fed through a coupling condenser 65 to the number three or signal grid of a tube similar to tubes 53 which may be a type 6SA7, and which comprises one of the modulators 27. The number three grid is also returned to ground through a grid load resistor 67. The cathode, and number two and four grids of tube 27, are connected to circuits similar to those of tubes 53, the number one grid is coupled to the output of the sawtooth generator 26 by being connected to the cathode of diode 34, and the anode is connected to B+ through a load resistor 69 and through a coupling condenser 70 to one plate 66 of the horizontal deflection plates of each of the guns 23 and 25 of the cathode ray tube 22. These plates may be returned to ground, for example, by a load resistor 71 shown in FIG. 3. The other plate 68 of the horizontal deflection systems of the guns 23 and 25 may be connected directly to ground, as shown in FIG. 1, or, if desired, to a voltage source variable about ground potential to allow adjustment of the zero position of the beams, according to well-known practice.

Figure 4:
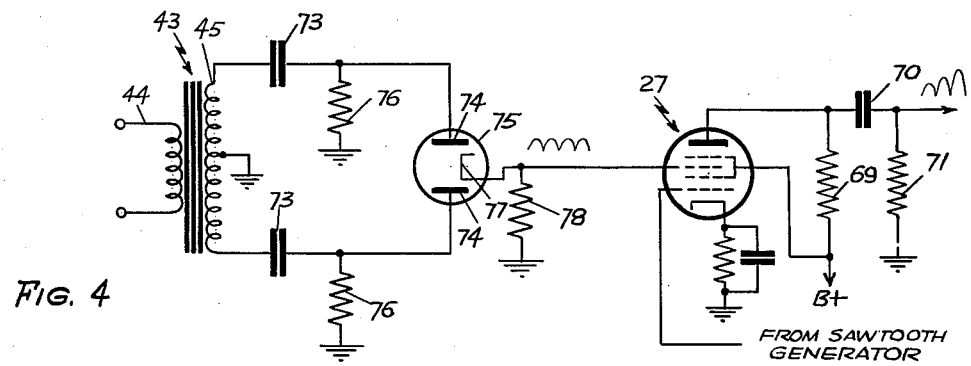
FIG. 4 is a schematic diagram of a vertical deflection generator which may be used in the system of FIG. 1.

The vertical deflection generator 72 may be, for example, of the type shown in FIG. 4 wherein the secondary winding 45 of the same transformer 45 used to energize the horizontal deflection generator is connected through coupling condenser 73 to, respectively, separate plates 74 of a full wave rectifier tube 75. Plates 74 are also returned to ground through separate resistors 76. The cathode 77 of tube 75, which is common to both the anodes 74, is connected to ground through a load resistor 78 across which the full wave rectified sine wave output of the vertical deflection generator appears. The output of the vertical deflection generator is fed to the sawtooth generator of FIG. 2 by connecting the cathode 77 of the vertical deflection generators through the limiting resistor 28 to the grid of the triode amplifier 29 of the sawtooth generator. The output of the vertical deflection generator is also fed through the other modulator 27, which is identical to the one shown in FIG. 3, including elements 69, 70 and 71, to one end of a conventional sine-cosine potentiometer 79, the other end of which is grounded as at 80. The movable potentiometer arm 81 has positioned thereon two electrical contacts 82 and 83, which are positioned substantially ninety degrees apart around the circle comprising movable arm 81 and which pick off voltages corresponding to the sine and cosine, respectively, of the angle through which the arm 81 is rotated. The arm 81 is mechanically ganged to a crank 84, which rotates the horizontal shaft supporting the transducer elements 11, such that when the fan-shaped radiation pattern of the transducer elements lies in a horizontal plane, the contact 83 will have a substantially zero sweep potential, while the contact 82, which is displaced ninety degrees therefrom, will have a relatively large sweep potential. As the crank 84 is rotated, either by hand or by a motor (not shown), to deflect the radiation pattern of the transducers 11 downward, the sweep potential at point 82 decreases and that of point 83 increases as movable arm 81 rotates. These potentials vary as the cosine and the sine, respectively, of the angle which the radiation pattern of the transducer elements 11 makes with the horizontal, until when said pattern has been deflected downward to a vertical, the contact 82 has a substantially zero sweep potential and the contact 83 has a maximum sweep potential. The contact 82 is connected to upper horizontal deflection plate 85 of the upper electron gun 25, while the contact 83 is connected to the lower vertical deflection plate 86 of the gun 23. The lower vertical deflection plate 87 of gun 25 and of upper vertical deflection plate 88 of gun 23 are connected to ground, or, if desired, to variable zero set potentials (not shown).

The cathodes 89 of the electron guns 23 and 25 are connected to ground in the embodiment illustrated. However, it is to be clearly understood that the cathodes could be connected to any desired biasing circuit for adjusting the intensity of the traces on the screen 24, for, indeed, the output of the amplifier 20 could be used to drive the cathodes 89, and the grids 21 could be used to control the average intensity of the traces.

Figure 5:
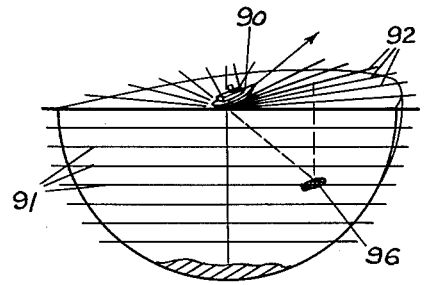
FIG. 5 is a perspective view of a section of a water body containing a target and a vessel utilizing equipment embodying the invention illustrated in FIG. 1.
Figure 6:
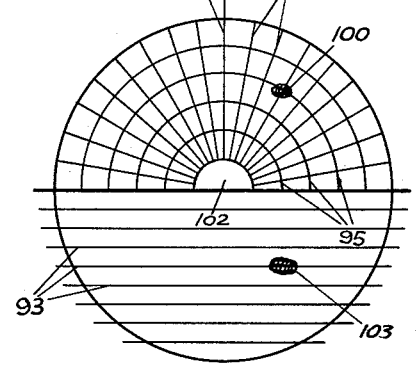
FIG. 6 is an illustration of the indication which may be expected on the face of the cathode ray tube indicator of the embodiment illustrated in FIG. 1 for the relative object position illustrated in FIG. 5.

The operation of the system illustrated in FIGS. 1 through 4 will now be described, reference being had to FIGS. 5 and 6. In FIG. 5, there is shown a quarter of a sphere showing a section of a body of water ahead of a ship 90, which will be scanned by the system of FIG. 1. Along the vertical face of the quarter-sphere there are drawn horizontal substantially equidistant lines 91 illustrating depths of the water body. Along the horizontal plane of the quarter-sphere on which the ship 90 rests, there are drawn azimuth lines 92 indicative of direction relative to the ship's head. In FIG. 6, there is shown a calibration which may be positioned in the face of the cathode ray tube 22. The lower half of the tube may contain horizontal substantially equidistantly spaced lines 93 corresponding to the lines 91 of FIG. 5 and indicating depth below the surface, which is represented by the horizontal diameter of the circular pattern of FIG. 6. The upper half of the pattern contains radial lines 94 corresponding to the azimuth lines 92 of FIG. 5, as well as half circular lines 95 centering about the center of the circular pattern and indicative of distance from the vessel 90 along the surface of the water body. There is shown by way of example a target 96, which may be, for example, a fish or other submerged object, positioned in the quarter-sphere body of water. If the transducers 11 have been tilted downward, such that their radiation pattern impinges on the target 96, the returning echoes will be picked up by one particular transducer 11 and will appear on one particular stator plate 16. For the particular system shown, the rotor plate 18 is fixed such that it is just passing the stator plate 16 fed by the transducer nearest the crank 84 at the start of the sweep wave form applied to the deflection plate of the guns 23 and 25.

At this time both electron beams are impinging on substantially the same spot which lies on the horizontal diameter of the fluorescent screen 24 to the left of the center thereof. The amount by which the point of impingement at this time is to the left of the center of target 24 is dependent on the sawtooth wave form output of the sawtooth generator 26. At the start of the wave form, the point of impingement of the beams along the horizontal diameter is near the center of the cathode ray tube, but as the sawtooth generator wave form increases in amplitude, the point of impingement moves farther and farther to the left. The wave form applied to the deflection plates of the guns 23 and 25 causes the upper gun to deflect its beam in substantially semi-elliptical paths 97, lying above the horizontal diameter of the screen, while the sweep wave forms applied to the gun 23 cause excursions of its beam in substantially semi-elliptical traces 98 below the horizontal diameter of the screen 24. The traces then return along the horizontal diameter of the screen to a point a little farther to the left than their starting point and they are now in a position to begin the next sweep cycle. The rotor 18 rotates clockwise for the device shown in FIG. 1, having one revolution for each cycle applied to the deflection plates of the guns 23 and 25, which occurs twice for each cycle of the alternating current source.

When an echo appears on one of the stator plates, it is picked off by the rotor 18 and fed through the amplifier and detector 20 to the grids 21 thereby producing bright spots 99 on the traces 97 and 98. The upper bright spot may be as indicated, for example at 100 in FIG. 6, lying along a radial line indicative of the direction of the object from the ship's head, which is represented by a vertical diameter 101 of the pattern in FIG. 6. The distance outward from the center 102 along a radial line to the bright spot 100, as ascertained by the circumferential lines 95, is indicative of the distance along the surface of the water to a point directly above the object 96. The lower bright spot 103, which always lies in the pattern substantially on the same vertical line as the corresponding bright spot 100, lies a certain distance below the horizontal diameter of the pattern, which may be ascertained by counting the calibrated depth lines 93 down to the bright spot 103 and is indicative of the depth of the object 96 below the surface of the water.

The eccentricity of the elliptical traces 97 and 98 automatically changes as the crank 84 is rotated to move the radiation pattern of the transducers to a more horizontal or a more vertical direction, and thus the indications appearing on the cathode ray tube surface are always substantially correct in bearing range and depth for all values of the vertical angle through which the transducers 11 are rotated.

Referring now to FIG. 7, there is shown a further embodiment of this invention wherein a single gun type cathode ray tube may be used. The transducer assembly 10, illustrated simply as a box, the amplifiers 15, the transmitter oscillator 13, the trigger pulse generator 14, the sawtooth generator 26 and the modulator 27 may be, if desired, identical with those illustrated and decribed in connection with FIG. 1. The output of the amplifiers 15 is fed to a capacitive type scanning system 104 of the same general type as that shown in FIG. 1, except that it has twice as many stator members as the device shown in FIG. 1. Half of the stator members 105 are arranged in substantially a semi-circle and are connected, respectively, one to the output of each of the amplifier 15, the other half of the stator members 106 are arranged in a semi-circle opposite the stators 105 and are connected, respectively, in parallel with the stators 105, but in reverse order, such that the rotor 107 of the commutator 104 scans the transducers from the crank end to the other end as it rotates in a clockwise direction and passes the stator 105 and then scans the transducers back toward the crank end in reverse order as the rotor 107 scans the stators 106. The rotor 107 is driven by a synchronous motor 108 similar to that of FIG. 1, but having half the speed thereof for the same frequency of the alternating current source.

The signals picked up by the rotor 107 are fed through an amplifier-detector 20, which may be similar to that shown in FIG. 1, and thence to the control grid 109 of a cathode ray tube 110. The cathode 111 thereof is connected to ground, but, if desired, may be connected to a suitable intensity control circuit. The electron beam of the cathode ray tube 110 produces traces on the screen 112 thereof, which are similar to those produced on the screen in FIG. 1. However, the traces on the upper half of the screen and the traces on the lower half of the screen are produced sequentially, that is, on a time-sharing basis. This is accomplished in the following manner. The sawtooth modulated sine wave output of modulator 27 is fed through a ninety degree phase shifter 113 to one of the horizontal deflection plates 114 of the cathode ray tube gun. The other horizontal deflection plate 115 is connected to ground or to the desired centering control. The output of modulator 27 is also fed to one end of sine-cosine potentiometer 79 similar to that described in FIG. 1 and mechanically ganged to the transducer system 10 in the same manner. The contact 82, which has a sweep voltage variable as the cosine of the vertical angle of the transducer assembly, with respect to the horizontal, is fed through a gate 116 during the positive excursion of the A.C. source. This is accomplished by shaping the sinusoidal A.C. source into a substantially square wave by means of a clipper amplifier 117 and passing the positive excursion of the square wave through a gating diode 118 by connecting the anode 119 of the diode to the output of the clipper amplifier and the cathode 120 of the diode 118 to ground through a load resistor 121 across which the positive gating pulse synchronized with the positive excursion of the alternating current source appears. The positive pulse occurring across the resistor 121 is fed to the gate 116 to open this gate during the period of the positive pulse. The gate circuit may use, for example, a tube and circuit similar to that of tube 53 illustrated in FIG. 3.

The output of gate 116 is a half cycle of a sine wave which lags the sine wave applied to the horizontal deflection plates by substantially ninety degrees due to the action of the phase shifter 113. The trace starts on the horizontal diameter at a point to the left of the center of the screen 112 at a time when the rotor 107 is just passing the first of the stators 105 at the bottom of the commutator 104 in a clockwise direction. During the ensuing half cycle an elliptical trace is produced whose eccentricity is dependent on the sine-cosine potentiometer 79. During this half cycle the rotor 107 moves past all of the stators 105. During the remaining half cycle the gate 116 is cut off and a gate 122 is open, which feeds the sweep potential appearing at the contact 83 of the sine-cosine potentiometer to the same horizontal deflection plate 114 as did gate 116. This can be accomplished by having the outputs of the gates 116 and 122 feed the same load resistor as in FIG. 3 and by applying a positive gating pulse to the gate 122 which is similar to the gating pulse applied to the gate 116, but one hundred eighty degrees out of phase therewith. Such a gating pulse may be obtained by feeding the output of the clipper amplifier 117 to the cathode 123 of a gating rectifying diode 124, whose anode 125 is connected through a signal load resistor 126 to ground. The substantially square wave pulse which appears across the resistor 126 is one hundred eighty degrees out of phase with the pulse appearing across the resistor 121, but is negative. Accordingly, the signal appearing across the resistor 126 is fed to a phase inverter 127, which may be, for example, a unity gain amplifier, to the gate 122. Thus during the negative portion of the sine wave of the alternating current source, the sweep potential of contact 83 is fed to the vertical deflection plates producing a negative excursion of the beam in a semi-elliptical trace as it returns to its starting point. During this period the rotor 107 scans the stators 106 and returns to its starting point. The use of this modification is similar to that of the modification shown in FIG. 1.

It is to be clearly understood that the capacitor commutator 104 of FIG. 7 and sinusoidal horizontal sweep could be substituted in the modification of FIG. 1 for the two-gun type with a suitable adjustment of the phase shifter 113 to forty-five degrees rather than ninety degrees and the capacitor commutator 17 illustrated in FIG. 1, together with the horizontal deflection generator 42, could be used in the modification shown in FIG. 7 with a suitable forty-five degree phase shift.

This completes the description of the embodiments of the invention illustrated herein. However, many modifications thereof will be apparent to persons skilled in the art without departing from the spirit and scope of this invention. For example, the sawtooth generator illustrated in FIG. 2 may also include an additional phase inverter and rectifier for inverting the negative pips of the differentiated square wave such that a positive pip is obtained to charge the capacitor 35 every scanning cycle rather than every other scanning cycle as is now the case. The transmitter oscillator is shown here by way of example only, and the transducers could be shock excited, if so desired. Further, the transducers may be of any desired type, such as crystal or magnetostrictive, and the beam shape of each transducer, as well as the number thereof, may be varied considerably within the scope of the invention. Accordingly, it is desired that this invention be not limited to the particular details of the embodiments disclosed herein, except as defined by the appended claims.

What is claimed is:

1. An electron discharge system comprising a cathode ray tube comprising electron beaming means and a target, means for cyclically scanning a first portion of said target with electrons from said electron beaming means, means for cyclically scanning a second portion of said target with electrons from said electron beaming means, means for modulating the electron beam elements produced by said electron beaming means in accordance with signals from a signal source, said source comprising means for transmitting signals omnidirectionally in a predetermined plane, means for continuously varying said predetermined plane, and means for varying the position of impingement of electrons on said portions in accordance with the orientation of said signal source.

2. An electron discharge system comprising a cathode ray tube comprising electron beaming means and a target, means for cyclically scanning a first portion of said target with electrons from said electron beaming means, means for cyclically scanning a second portion of said target with electrons from said electron beaming means, a plurality of signal sources comprising a plurality of directive radiation receiving elements aligned in a predetermined plane, means for continuously varying said predetermined plane, switching means for scanning said signal sources, means for modulating the electron beam elements produced by said electron beaming means in accordance with the output of said switching means, and means for varying the position of impingement of electrons on said portions in accordance with the orientation of said signal sources.

3. An electron discharge device comprising a cathode ray tube system comprising electron beaming means and target means, said electron beaming means comprising a plurality of electron guns, means for cyclically scanning a first of said target means with electrons from said electron beaming means, means for cyclically scanning a second of said target means with electrons from said electron beaming means, means for modulating the electron beam elements produced by said electron beaming means in accordance with signals from a signal source, and means for varying the position of impingement of electrons on said target means as substantially sine and cosine functions, respectively, of the orientation of said signal source.

4. An electron discharge system comprising a cathode ray tube comprising electron beaming means and a target, said electron beaming means comprising a plurality of electron guns, means for cyclically scanning a first portion of said target with electrons from said electron beaming means, means for cyclically scanning a second portion of said target with electrons from said electron beaming means, a plurality of directive radiation signal sources aligned in a predetermined plane, switching means for scanning said signal sources, single means for continuously varying said predetermined plane, means for modulating the electron beam elements produced by said electron beaming means in accordance with the output of said switching means, and means for varying the position of impingement of electrons on said portions in accordance with the orientation of said signal sources.

5. An electron discharge system comprising a cathode ray tube comprising electron beaming means and a target, means for cyclically scanning a first portion of said target along a substantially semi-elliptical path with electrons from said electron beaming means, means for cyclically scanning a second portion of said target with electrons from said electron beaming means, means for modulating the electron beam elements produced by said electron beaming means in accordance with signals from a signal source, said source comprising a directional energy radiation element, and means for varying the position of impingement of electrons on said portions in accordance with the orientation of said signal source.

6. An electron discharge system comprising a cathode ray tube comprising electron beaming means and a target, means for cyclically scanning a first portion of said target along a substantially semi-elliptical path with electrons from said electron beaming means, means for cyclically scanning a second portion of said target along a substantially semi-elliptical path with electrons from said electron beaming means, a plurality of signal sources, each of said sources comprising a directional energy radiation element, means for scanning said signal sources, switching means for scanning signal sources, means for modulating the electron beam elements produced by said electron beaming means in accordance with the output of said switching means, and means for varying the position of impingement of electrons on said portions in accordance with the orientation of said signal sources.

7. An electron discharge system comprising a cathode ray tube comprising electron beaming means and a target, means for cyclically scanning said target with electrons from said electron beaming means in accordance with a predetermined pattern comprising substantially a portion of an ellipse, means for modulating the electron beam elements produced by said electron beaming means in accordance with signals from a signal source, said source comprising a directional energy radiation element, and means for varying the shape of said pattern in accordance with the orientation of said element.

8. An electron discharge system comprising a cathode ray tube comprising electron beaming means and a target, means for cyclically scanning said target with electrons from said electron beaming means in accordance with a predetermined pattern comprising substantially a portion of an ellipse, means for modulating the electron beam elements produced by said electron beaming means in accordance with signals from a signal source, said source comprising a directional energy radiation element, means for cyclically varying the size of said pattern, and means for varying the shape of said pattern in accordance with the orientation of said element.

9. An electron discharge system comprising means for radiating signals, directional receiving means for receiving reflected signals from said radiated signals, a cathode ray tube indicator comprising electron beaming means and a target, means for cyclically scanning said target with electrons from said electron beaming means in accordance with a predetermined pattern comprising substantially a portion of an ellipse, means for comparing the time relationship of said received signals with said radiated signals, means for cyclically varying the size of said pattern as a function of the results of said comparison, and means for varying the shape of said pattern in accordance with the orientation of said directional receiving means.

10. An electron discharge system comprising means for radiating signals, directional receiving means for receiving reflected signals from said radiated signals, a cathode ray tube indicator comprising electron beaming means and a target, means for cyclically scanning said target with electrons from said electron beaming means in accordance with a predetermined pattern comprising substantially a portion of an ellipse, means for comparing the time relationship of said received signals with said radiated signals, means for increasing the size of said pattern as a function of the time difference between said radiated and received signals, and means for varying the shape of said pattern in accordance with the orientation of said directional receiving means.

11. An electron discharge system comprising means for radiating signals, a plurality of directional receiving means for receiving reflected signals from said radiated signals, a cathode ray tube indicator comprising electron beaming means and a target, means for cyclically scanning said target with electrons from said electron beaming means in accordance with a predetermined pattern comprising substantially a portion of an ellipse, switching means for scanning said receiving means, means for cyclically varying the size of said pattern as a function of the time difference between said radiated and received signals, and means for varying the shape of said pattern in accordance with the orientation of said element.

12. An electron discharge system comprising a cathode ray tube comprising an electron gun and a target, means for modulating the electron beam produced by said electron gun in accordance with signals from a signal source, said source comprising a directional energy radiation element, and means for sequentially scanning a first portion of said target with a pattern comprising substantially a portion of an ellipse whose shape varies as the sine of the angle of declination of the direction of radiation of said element and a second portion with a pattern whose shape varies as the cosine of said angle.

13. An electron discharge system comprising a cathode ray tube comprising an electron gun and a target, means for modulating the electron beam produced by said electron gun in accordance with signals from a signal source, said source comprising a directional energy radiation element, means for sequentially scanning a first portion of said target with a pattern whose shape varies as the sine of the angle of declination of the direction of radiation of said element and a second portion with a pattern whose shape varies as the cosine of said angle, and means for cyclically varying the size of said patterns.

References Cited in the file of this patent

UNITED STATES PATENTS

| 2,477,050 | Dyson | July 26, 1949 |
| 2,528,730 | Rines | Nov. 7, 1950 |
| 2,649,581 | Tasker | Aug. 18, 1953 |
| 2,666,191 | Knauss | Jan. 12, 1954 |